Jan. 23, 1962 J. W. BROWN 3,018,110

SPEED SHIFT CONTROL FOR PHONOGRAPHS

Filed May 9, 1956

INVENTOR
Jack W. Brown
BY George H. Fritzinger
Agt.

United States Patent Office 3,018,110

Patented Jan. 23, 1962

3,018,110

SPEED SHIFT CONTROL FOR PHONOGRAPHS

Jack W. Brown, Elizabeth, N.J., assignor, by mesne assignments, to McGraw-Edison Company, Elgin, Ill., a corporation of Delaware Filed May 9, 1956, Ser. No. 583,766
1 Claim. (Cl. 274—9)

This invention relates to improvements in phonographic machines adapted to be used for recording and reproducing dictation, and is described in connection with such a machine for recording and reproducing from disc records, but no unnecessary limitation to such records is intended.

A dictating machine is preferably arranged for driving a record at only one given speed, but machines for transcribing from such records are generally arranged to permit the transcriber to adjust the machine to suit her tempo. Heretofore, this speed adjustment has sometimes been accomplished by varying the speed of the motor itself. However, variations in motor speed can be accomplished only with special types of motors which are generally not well suited for modern dictating and transcribing machines because of their size and cost.

The present invention relates to an improved speed drive mechanism for portable phonographs of the type used for both recording and transcribing dictation, which permits the use of relatively cheap drive motors for such equipment, and in which, after the recording has been accomplished at an optimum speed, said speed is automatically reduced upon changing the setting of the phonograph from that for recording to that for reproducing, whereby the reproduction occurs at an optimum speed from the standpoint of the user.

One reason for the shifting of the speed ratio is that more power is required for recording dictation because a sound groove has to be cut in a record. Correspondingly less power is required for reproducing from that sound groove in the record. Therefore, with a given setting of the speed ratio, the speed of the turntable, or other holder of a record, tends to increase upon shifting from recording to reproducing, so that a change in the drive ratio is desirable to keep the speed down to one suitable for transcription. In accordance with the present invention, this reduction in speed is accomplished simultaneously with a mere shifting from a setting of the machine for recording to that for reproducing without any other adjustment, thereby relieving the user of the necessity for another operation to condition the machine for reproduction.

An object of the invention is to provide, in connection with a combination dictating and reproducing machine, mechanism which when the machine is changed from recording to reproducing or vice versa, provides for a simultaneous change in the speed ratio, whereby the machine runs at optimum speed for reproducing as well as at an optimum speed for recording.

Another object is to provide a dictating machine which is adapted for alternate use for recording dictation or transcribing the same, and which includes means for simultaneously varying the drive speed of said machine from that optimum for recording to that optimum for transcribing, as the setting of the machine is changed from the one to the other, thereby avoiding the necessity of the operator thinking about making a speed adjustment when the use of the machine is varied from one to the other.

A further object is to provide a machine with a variable speed drive which is suitable for use both as a dictating machine or as a transcribing machine, and in which the variation in speed occurs as the setting of the machine is changed from one for recording to one for reproducing or vice versa, without the necessity of any other adjustment on the part of the operator.

These and other objects and advantages will become apparent from the following detailed description when taken with the accompanying drawings. It will be understood that the drawings are for purposes of illustration and do not define the scope or limits of the invention, reference being had for the latter purpose to the appended claim.

In the drawings, wherein like reference characters denote like parts in the several views.

Figure 1:
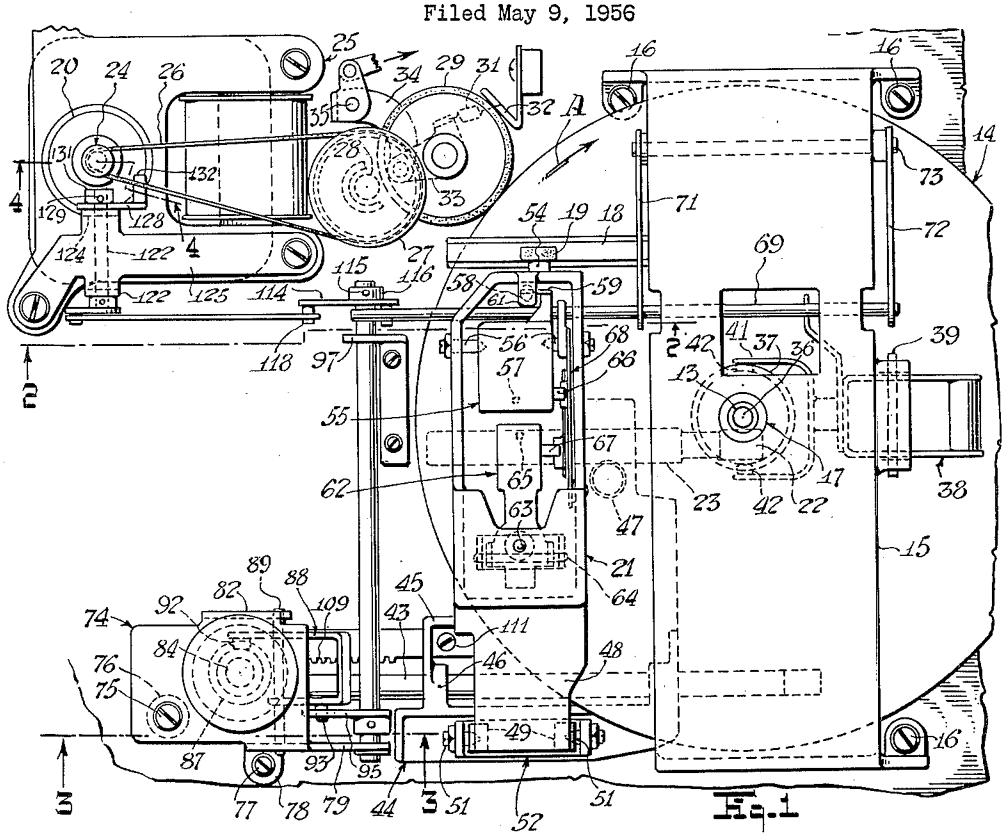
FIGURE 1 is a fragmentary top plan view of a recording and reproducing machine as seen with the top section of the housing removed.

The improvement of the present invention is in a preferred embodiment incorporated in a phonograph machine such as generally disclosed in the Somers application, Serial No. 347,875, filed April 10, 1953, now Patent No. 2,866,647, dated December 30, 1958, having common ownership with the present application, and to which reference may be made for specific details. The speed of the machine is varied automatically as the setting is changed between that for the recording of dictation and that for the transcribing of such.

For present purposes, such a machine need be only partially described. It comprises, for instance, a housing or case consisting of two pan-shaped housing sections, that is, a top section 11 and a bottom section 12, having inverted relationship to each other and joined mainly on a medial plane of the assembled housing. A turntable 14 has a depending tubular shaft not shown but which is in line with an upper bearing 13 hereinafter described and which is journaled on the bottom section 12. A bridge 15 overlies the turntable diametrically thereof and is mounted on the lower housing section 12 at its ends, as by being secured thereto by screws, three of which are shown at 16. The bridge carries a record clamp 17, partially indicated, for holding a record disc on the turntable. Extending laterally from the left side of the bridge is a support rod 18 on which rides a roller 19 journaled with respect to the rear of the main carriage 21.

The shaft of the turntable carries a worm gear which meshes with a worm wheel 22 on a feed screw 23 supported at its ends in suitable bearings, not shown. The turntable 14 is driven in the direction of the arrow A from a drive pulley 24 on the shaft of the armature 20 of a motor 25 through a belt 26 to a driven wheel 27 having a driving spindle 28 for engagement with a friction idler wheel 29. The idler wheel 29 is urged by a tension spring 31 against the peripheral rim of the turntable 14 and against a brake shoe 32, for braking the turntable against movement. The idler wheel 29 is journaled to a link 33, in turn pivoted to a control lever 34, itself pivoted on a stud 35. Thus, by turning the control lever, the idler wheel 29 is moved from the brake shoe 32 along the peripheral rim of the turntable 14 into frictional engagement with the driving spindle 28.

The bearing 13 is disposed axially in line with the turntable and receives rotatably a plunger rod 36 which carries a record-clamping member 37. The plunger rod is movable upwardly and downwardly by a transversely-extending U-shaped lever 38 which is pivoted to the right side of the bridge 15 on a pin 39. Secured to the inner end of the U-lever is a fork 41, having diametrically opposite pins 42 which engage a peripherally-grooved portion of the record-clamping member 37. The U-lever 43 is coupled to a door (not shown) hinged to the top section of the housing. This door may be opened to provide space for the fingers in mounting and removing a disc record onto and from the turntable 14. The coupling between the door and the U-lever 41 is such that the record-clamping member is engaged and disengaged with respect to the turntable as the door is closed and opened, as more fully described in the Somers application referred to.

On the front portion of the lower housing section 12 there is a pair of standards (not shown) supporting a front cross rod 43. Mounted slidably on this cross rod 43, and another cross rod (not shown), is a subcarriage 44. This subcarriage comprises a casting 45 having apertured lugs, one of which is shown at 46, slidably embracing the cross rod 43. Mounted on the subcarriage 44 is a bracket plate (not shown) carrying a vertical stud on which is journaled a circular feed nut 47, which meshes with the feed screw 23. The circular feed nut 47 is held by friction in a normally stationary condition with respect to the subcarriage and under sufficient adjustable pressure so that the carriage may be driven upon rotation of the feed screw 23, but under insufficient pressure to prevent the carriage from being moved by hand.

The main carriage 21 overlies the subcarriage 44, and comprises a hollow rectangular casting provided with a forward extension 48. This extension 48 terminates in two downwardly-extending feet 49 which are apertured for pivotal engagement with trunions 51. These trunions are threaded through the arms of an upstanding U-bracket 52, mounted on the front apron of the subcarriage 44. Secured to the rearward end of the main carriage is a stud 54 on which is journaled the roller 19 which rides on the cross rod 18. Thus, the main carriage rides on the rod 18 at its rearward end and is hinged and held by the subcarriage 44 at its forward end.

A recorder 55 is mounted in the rearward portion of the main carriage 21 on a pair of cone pivots 56 that are threaded through the side walls of said carriage. This recorder has a stylus 57 at its forward end for engaging a record mounted on the turntable 14. Biasing force to exert suitable pressure on the stylus against the record is provided partially by the weight of the recorder and partially by a tension spring 58 connected between a tail piece 59 on the recorder and an overhanging tab 61 on the main carriage.

A reproducer 62 is mounted in the front portion of the main carriage with universal (lateral and vertical) freedom of movement. Horizontal swinging is permitted about the pin 63 and vertical swinging is provided for by the horizontal pin 64. The reproducer has a stylus 65 at its rearward end for engaging the record under the influence of its own weight. In the normally centralized position of the reproducer, the stylus thereof engages the record at a short trailing distance behind the recorder, with respect to the direction of the advance of the carriage.

The recorder and reproducer have laterally-extending pins 66 and 67 at their free end portions by which they may be lifted from the record. The lifting is done through a lever mechanism 68 mounted on the right wall of the main carriage, and operable by a lift rod 69 that extends parallel to the path of travel of the carriage. This lift rod is mounted for up and down movement on parallel rods 71 and 72 which are secured to a shaft 73 journaled in the bridge 15. The lever mechanism 68 is such that when the lift rod 69 is in a raised position, both the recorder and reproducer are withheld from the record; that when the lift rod is in intermediate position, only the reproducer engages the record; and when the lift rod is in lowered position, both the recorder and reproducer engage the record. In the last-mentioned position of the lift rod, however, the audio circuits are completed only with respect to the recorder. In view of these functions of the lift rod, its uppermost, intermediate and lowered positions are herein termed its "neutral," "reproducing" and "recording" positions, respectively.

Figure 3:
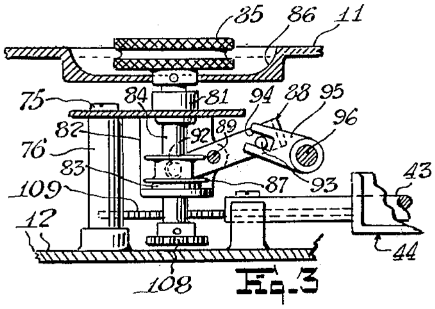
FIGURE 3 is a fragmentary vertical sectional view on the line 3—3 of FIGURE 1, in the direction of the arrows.

Record reproduction control mechanism is mounted on the left end portion of a bracket plate 74. This bracket plate is secured at its left end by a screw 75 to a post 76 upstanding from the lower housing section 12 (FIGURES 1 and 3). The bracket plate is also secured to the lower housing section 12 by a screw 77 passing through a foot 78 formed on its depending front side wall 79.

The bracket plate 74 has a vertical bearing 81 and a right angled lug 82 depending therefrom and carrying a second vertical bearing 83 in line with the first bearing. These bearings support a shaft 84 for rotational and for vertical translational movement. On the upper end of this shaft there is secured a control knob 85. When the shaft is in its downward position, called its "record" position, the control knob is disposed in a circular recess or well 86 in the upper housing member 11. This well is substantially larger in diameter than the knob to provide easy access to the latter by the hand, so that the knob 85 can be easily raised into reproduce position if desired.

Secured as by a pin (not shown) to the portion of the shaft 84 between the bearings 81 and 83 is a grooved wheel 87. Positioned to the right of the machine from this grooved wheel is a bail 88, pivoted on a horizontal pin 89. The pin 89 is supported at its forward end by the side wall 79 and at its rearward end by the lug 82 depending from the bracket plate 74. The rear arm of the bail 88 carries a stud 92, which is received in the groove of the wheel 87 to cause the bail to be rocked as the shaft 84 is raised or lowered. This bail has a pin 93 engaged by a fork 94 on an arm 95 secured to a front-to-back-extending shaft 96. This shaft is journaled at its forward end in the wall 79 and at its rearward end in a bracket 97 upstanding from the lower housing section 12. This coupling of the bail 88 to the shaft 96 is such as to cause the latter to be turned counterclockwise, as viewed in FIGURE 3, as the knob 85 is raised from recording to reproducing position.

Figure 2:
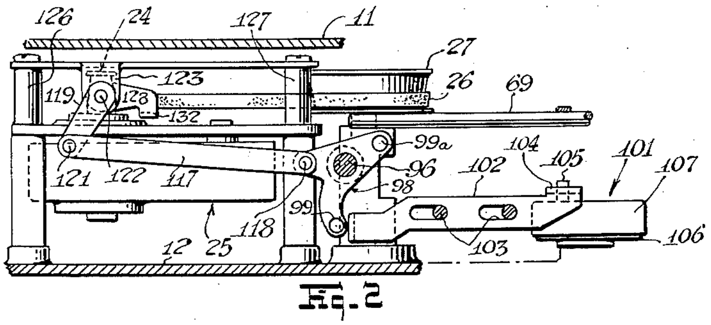
FIGURE 2 is a fragmentary vertical sectional view on the line 2—2 of FIGURE 1, in the direction of the arrows.

On the rearward end of the shaft 96 there is a plate 98 having a hub 116 secured by a pin 115 to the shaft. This plate has a depending arm carrying a cross pin 99 for operating an amplifier reversing switch 101, through a slide 102, as the control knob 85 is raised from recording to reproducing position. The slide is mounted by pin and slot means 103 on a vertical flange of a bracket (not shown) and has a forked end portion 104 overlying said switch and engaging a pin 105 upstanding therefrom, as shown in FIGURE 2. This switch, which is preferably of the character described in the Dann Patent No. 2,280,143, is mounted on the lower housing section 12 and has a base from which projects a series of terminals. Extending upwardly from the base is a cylindrical housing 106 and overlying this housing is a rotatable cup 107 to which the pin 105 is secured. The cup is urged clockwise, as viewed from above, into a switching position adapted for recording, as by a tension spring (not shown).

In response to this biasing, the slide 102 is urged leftwardly into the position shown in FIGURE 2. However, as the control knob 85 is raised into reproduce position, the pin 99 of the arm 98 strikes the end of the slide 102 and moves it rightwardly to place the amplifier switch 101 in reproduce position. Also, as the control knob is so raised a pin 99*a* on a rightwardly-extending arm of the plate 98 engages the underside of the lift rod 69 and raises it from recording to reproducing position. Thus, the raising of the control knob 85 to reproduce position not only permits the reproducer to engage the record but places the amplifier switch 101 in reproduce position to complete the conditioning of the machine for reproducing.

Secured to the lower end of the shaft 84 is a pinion 108 for engagement with a rack 109 secured to the subcarriage 44 as by screws, one of which is shown at 111. This rack extends leftwardly from the subcarriage in line with its direction of travel. However, it is only when the control knob 85 is raised to reproduce position that this engagement occurs. When the knob is in recording position, the pinion is below the rack and out of engagement therewith, as shown in FIGURE 3. This pinion-rack engagement enables the subcarriage 44, and the main carriage 21 secured thereto, to be moved forwardly and backwardly through their paths of travel by rotation of the control knob 85 when the knob is in its reproduce position. By such rotation, the carriage can be backspaced or advanced at will to any desired position.

Typically, the carriage will be moved by the control knob 85 to scan recorded areas for listening back to selected portions of one's dicetation, for spacing the carriage ahead at the end of a dictation unit, and for returning the carriage to start position at the end of the recordation of a record. These normal movements of the carriage are preformed while the machine is conditioned for reproducing.

Since the control knob 85 is raised by hand, and since the teeth of the pinion 108 are likely to be out of alinement with those of the rack 109 as the knob is manually raised, it is desirable that there be vertical yieldability between the pinion and rack to prevent forcing the pinion against the rack as one endeavors to raise the knob. Such yieldability may be provided by splining the pinion 108 to the shaft 84 as by means of a cross pin transversing diametrically-opposite open-ended slots in the lower portion of the shaft and engaging internal diametrically-opposite grooves in the pinion at its ends. A tension spring disposed in a cylindrical recess of the shaft 84 may be connected between the pin of the grooved wheel 87 beforementioned and the cross pin transversing the open ended slots to hold the pinion yiedably in a raised position relative to the shaft, as more fully disclosed in the Somers application previously referred to. Thus, if the teeth of the pinion strike against those of the rack as the knob is pulled upwardly, the spring yields until the knob is subsequently turned to aline the teeth, whereupon the pinion is snapped into engagement with the rack.

The specific means of the present embodiment for shifting the belt 26 to change the speed of the turntable 14 as the control knob 85 is moved between recording and reproducing positions, will now be described. The driving pulley 24 is desirably shaped as shown in detail in FIGURE 4. That is, there is a crown near its lower end, but with a maximum diameter above its lower end. The pulley 24 terminates in a relatively large bottom flange 112 and has a relatively small top flange 113. When the mechanism is set for recording, the belt is in the lowermost position, as shown in full lines in FIGURE 4, where a maximum speed is provided for by virtue of said belt engaging the drive pulley 24 at its point of maximum diameter.

However, when the control knob 85 is raised to shift the mechanism to reproducing condition, the belt is shifted to an upper portion of the drive pulley 24. The means for accomplishing this function comprises a crank arm 114 on the plate 98, a second crank arm 119 of a belt shifter, and a link 117 pivoted at 118 to the arm 114 and at 121 to the arm 119. The crank arm 119 is fixed on a shaft 122 journaled in bearings provided by lugs 123 and 124 depending from support plate 125, the ends of which are respectively secured to posts 126 and 127 upstanding from the lower bottom section 12 of the housing. These posts may be some of the means which serve for holding the motor 25 in position.

This shaft 122 has on its rear end a crank 128, fixed thereto as by means of a pin 129 through its hub 131. This crank is formed with a projection or angular lug 132 which, when the mechanism is in recording position, underlies and is spaced from the belt 26, as shown. However, upon the shaft 122 being turned counterclockwise as the control knob 85 is raised to reproducing position, the crank arm 128 swings to cause its lug 132 to rise from the full line position to the dotted line position of FIGURE 4, and correspondingly raise the belt 26 from its full to its dotted line position, to thereby tend to decrease the speed at which the driven wheel 27 turns, simultaneously with the shift of the mechanism from recording to reproducing position.

Figure 4:
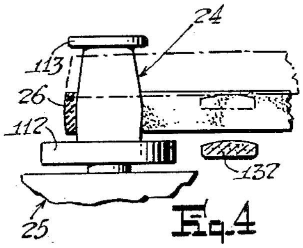
FIGURE 4 is a fragmentary vertical sectional view on the line 4—4 of FIGURE 1, in the direction of the arrows, and with parts in elevation.

A reverse operation occurs when the knob 85 is pushed down to recording position. That is, the lug 132 is then lowered from its dotted to its full line position, as shown in FIGURE 4, whereupon the belt 26 automatically shifts from its dotted to its full line position and effects a corresponding increase in speed of the machine or to one suitable for recording purposes.

From the foregoing disclosure, it will be seen that I have devised a speed-changing mechanism for a phonograph suitable for both recording and reproducing, in which a change from one to the other effects a simultaneous change between the optimum speed for recording and the optimum speed for reproducing, without any other adjustment necessary on the part of the operator.

The embodiment of my invention herein particularly shown and described is intended to be illustrative and not limitative of my invention since the same is subject to changes and modifications without departure from the scope of my invention, which I endeavor to express according to the following claim.

I claim:

In a phonograph having a movable record support, translating means for embossing a record on said support during recording and for tracking the embossed groove during reproducing, and an operable mechanism for providing a scanning movement between said record and translating means: the combination of a drive motor for said operable mechanism tending to have a lower speed during an embossing operation and a relatively higher speed during a tracking operating; means shiftable for conditioning said phonograph for recording and reproducing; a drive transmission coupling said motor to said mechanism including a speed-regulating means shiftable to higher and lower transmission ratios; and means intercoupling said speed-regulating means and conditioning means for changing the transmission ratio of said drive coupling by a predetermined amount as said phonograph is shifted between recording and reproducing conditions adapted to compensate for the different load conditions on said motor during recording and reproducing whereby to cause the signals reproduced by the phonograph to have substantially the same pitch as the original.

References Cited in the file of this patent

UNITED STATES PATENTS

| | | |
|---|---|---|
| 2,307,475 | Underhill | Jan. 5, 1943 |
| 2,482,212 | Rieber | Sept. 20, 1949 |
| 2,506,665 | Giovannucci | May 9, 1950 |
| 2,613,939 | Moore | Oct. 14, 1952 |

FOREIGN PATENTS

| | | |
|---|---|---|
| 120,534 | Austria | Dec. 27, 1930 |
| 152,528 | Australia | Apr. 20, 1950 |